UNITED STATES PATENT OFFICE.

UICHIRO ISHIKAWA, OF TOKYO, JAPAN.

PROCESS OF PURIFYING ELECTROLYTIC CHLORIN.

1,166,524.  Specification of Letters Patent.  Patented Jan. 4, 1916.

No Drawing.  Application filed April 6, 1915.  Serial No. 19,620.

*To all whom it may concern:*

Be it known that I, UICHIRO ISHIKAWA, a subject of the Empire of Japan, residing at No. 357 Nishigahara, Takinokawamachi, Kitatoshima-gun, Tokyo, Japan, have invented certain new and useful Improvements in Processes of Purifying Electrolytic Chlorin, of which the following is a specification.

This invention relates to a process of eliminating a small quantity of hydrogen contained in the chlorin gas obtained by electrolysis, and during the process the small quantity of hydrogen is positively combined with a part of the chlorin by action either singly or simultaneously of catalyzers, radiation rays causing chemical actions, or electrical discharge, in order to produce a corresponding quantity of hydrochloric acid, then this hydrochloric acid is decomposed by an oxidizing agent or agents into chlorin and water so that the contained hydrogen is finally eliminated in the form of water.

The object of this invention is to completely eliminate the small amount of hydrogen contained in the chlorin which is obtained by electrolysis of chlorids.

In the electrolysis of aqueous solution of common salt, and especially when it is executed by the process wherein mercury is employed as cathode, a certain quantity of hydrogen is produced in the electrolyzing chamber by various causes and this hydrogen is mixed into the so called anode gas which consists mainly of chlorin. When the percentage of this mixed hydrogen reaches about 1, it does not generally combine with chlorin in a violent manner, but as the percentage of hydrogen increases, there sometimes occurs an explosion. When such anode gas containing hydrogen is brought into contact with slaked lime to make bleaching powder there is some danger because the quantity of the gas in the chamber is very large. Even when the percentage of hydrogen contained in anode gas may be very small at first, yet since the chlorin only is absorbed by the slaked lime while the hydrogen remains unabsorbed, the percentage of hydrogen to the chlorin increases gradually and therefore in certain cases it may combine suddenly with chlorin to cause an explosion. Therefore, though the percentage of the hydrogen is within the safety limit in the electrolytic cell, it becomes dangerous in the chambers, especially on account of the large quantity of gas in the large chamber, and an explosion here may be very violent and very disastrous.

Even when the chlorin and hydrogen do not combine suddenly, but, in a gradual manner, hydrochloric acid is necessarily produced and such hydrochloric acid acts upon the bleaching powder or slaked lime in the bleach chamber to produce calcium chlorid and this calcium chlorid remains in the bleaching powder, so that the finished product may become pasty or crusty, and very inconvenient for use.

To avoid the aforementioned defects, it is of course necessary to pay serious attention to the operation of electrolysis itself. But in factories of large scale it is very difficult to work all the cells in a perfect manner. Therefore, when there are a few of them in which a very small quantity of hydrogen is produced, even though the hydrogen is very small in the so called anode gas, yet it will eventually either cause an explosion or make the finished product of inferior quality for the reasons stated above. When the chlorin used for other purposes e. g. is compressed to make liquid chlorin, etc., it is very evident that the hydrogen is also injurious.

The object of this invention is to eliminate the hydrogen contained in anode gas, when it is still in a very small quantity, so as to obtain anode gas consisting mainly of chlorin and without hydrogen.

According to this invention, the anode gas coming from the electrolytic cells, after being dried or without any preparatory treatment, is passed, through (first) a catalyzer or catalyzers, made of one or more of salts or metals such as platinum, gold, iron, nickel, cobalt, chromium, copper or other catalytic such as carbon, etc., maintained at suitable temperature, or (second) it is passed through vessels made of a suitable material such as quartz glass, uviol glass, etc., which are transparent and exposed to radiation rays causing chemical action for instance one or more of the following rays: sun light, mercury lamp ray, magnesium combustion ray, arc ray, electrical vacuum discharging ray, etc., or (third) through an electrical discharging tube, and thus, by one of these methods, all the hydrogen combines with a corresponding amount of chlorin to produce hydrochloric acid. Of course, two or three of the above actions may be employed instead of one only. Thus, the anode gas coming from the electrolytic cells and consisting mainly of chlorin, after the above treatment will contain a small quantity of hydrochloric acid. Therefore this is passed through a suitable apparatus containing an oxidizing agent or agents for instance: one or more peroxids, dioxids, persalts, etc., to act upon the hydrochloric acid to produce chlorin and water, after which it can be easily dried. Therefore the mixed hydrogen is finally eliminated from the anode gas in the form of water.

One example of the above mentioned process can be carried out in the following manner. The gas coming from the electrolytic cells is passed first through an apparatus containing pumice stone or asbestos carrying powdered iron, this being preferably directly exposed to sun light, thence through a receptacle containing manganese dioxid. The chlorin thus obtained contains a small quantity of water which is easily removed in the usual manner.

In the above case, if one or more of certain substances, catalyzers as well as oxidizing agents, for instance, manganese peroxid, or ferric oxid, etc., are used and anode gas coming from the electrolytic cells is passed through an apparatus filled with one or more of such substances with or without heating, then the production of hydrochloric acid and the decomposition thereof into chlorin and water can be simultaneously effected by one agent. Of course, in this case one may employ simultaneously one or more of said rays causing chemical action or an electrical discharge. One example of this latter case is in the following. The gas to be treated is introduced in an apparatus filled with manganese dioxid and this apparatus is heated at the gas entrance only. The mixed hydrogen combines with the chlorin in this comparatively hot zone and as the gas passes through the comparatively cool zone the hydrochloric acid is oxidized to chlorin and water. The heating of this apparatus, however, may be stopped after the initial heating if there is a large quantity of hydrogen in the gases treated, since the reaction produces sufficient heat to maintain the materials at a reacting temperature.

I claim:—

1. A process of eliminating hydrogen from chlorin gas, which comprises causing at least the major portion of the hydrogen to unite with chlorin and produce hydrochloric acid, and reacting upon said hydrochloric acid with an oxidizing agent capable of producing free chlorin and water.

2. A process of eliminating an impurity from a gas containing relatively large amounts of chlorin, which comprises causing at least a portion of said impurity to react with chlorin to produce a chlorin-containing body; reacting upon said chlorin-containing body with an agent capable of setting free at least the major portion of the chlorin content thereof, and of leaving in the gas under treatment a material more easily removed than the original impurity, and thereafter removing said material from the chlorin-containing gas.

3. In the treatment of chlorin gas containing a small amount of hydrogen, the step of passing the gas in contact with a mass of material which is capable of effecting the union of the hydrogen with chlorin to produce hydrochloric acid, and then into contact with a cooler mass of said material, to oxidize the hydrochloric acid to free chlorin and water 4. In the removal of impurities comprising free hydrogen from chlorin gas, the step of passing the chlorin gas under treatment, into contact with a catalyst capable of aiding the union of hydrogen with chlorin, and simultaneously subjecting the said gas to the action of light containing actinic rays, to supplement the action of the catalyst.

5. A process which comprises passing chlorin gas containing hydrogen in contact with a catalytic agent capable of causing the union of at least the major portion of the hydrogen with chlorin to form hydrochloric acid, and thereafter oxidizing the hydrochloric acid to produce free chlorin and water.

6. The process which comprises passing chlorin gas containing hydrogen in contact with hot $MnO_2$, and thereafter into contact with cooler $MnO_2$.

In testimony whereof I affix my signature in presence of two witnesses.

UICHIRO ISHIKAWA.

Witnesses:
  SUGAO SOGA,
  GENJI KURIBARA.